Figure 1:
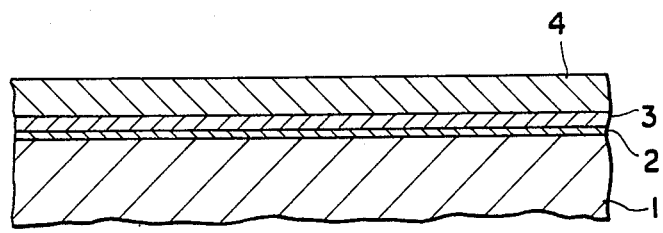

United States Patent [19]

Masuhara et al.

[11] Patent Number: 4,702,968
[45] Date of Patent: Oct. 27, 1987

[54] HEAT RESISTANT PRECOATED STEEL SHEET AND PROCESS FOR THE PRODUCTION THEREOF

[75] Inventors: Kenichi Masuhara; Kazuo Yamayoshi; Kouji Wakabayashi, all of Chiba, Japan

[73] Assignee: Nisshin Steel Co., Ltd., Tokyo, Japan

[21] Appl. No.: 825,262

[22] Filed: Feb. 3, 1986

[30] Foreign Application Priority Data

Feb. 2, 1985 [JP] Japan .................. 60-18986

[51] Int. Cl.$^4$ .............. B32B 15/08; C23C 22/24
[52] U.S. Cl. .................. 428/623; 428/624; 428/629; 428/632; 428/653; 427/409; 427/419.5; 148/6.2
[58] Field of Search ............ 181/244, 246, 256; 428/624, 623, 632, 629, 653, 658; 427/409, 419.5; 148/6.2

[56] References Cited

FOREIGN PATENT DOCUMENTS 1179558 12/1984 Canada .................. 427/409
0148718 11/1983 European Pat. Off. ...... 427/409
14942 1/1984 Japan .................. 427/409
240956 11/1985 Japan .................. 427/409

*Primary Examiner*—L. Dewayne Rutledge
*Assistant Examiner*—George Wyszomierski
*Attorney, Agent, or Firm*—Wenderoth, Lind & Ponack

[57] ABSTRACT

A heat resistant precoated steel sheet suitable for use in the manufacture of a muffler of an automobile exhaust gas system comprising:

a hot dip aluminized steel sheet, a chromate pretreatment layer formed on at least one surface of said hot dip aluminized steel sheet and having a chromium pickup of 10 to 50 mg/m$^2$, a primer coat formed on said pretreatment layer and comprising a cured polyamide imide resin and 8 to 52 parts by weight, based on 100 parts by weight of said resin, of strontium chromate intimately admixed with said resin, and a top coat formed on said primer coat and comprising a cured silicone-modified polyester resin with a modification degree of from 30 to 50% and 8 to 32 parts by weight, based on 100 parts by weight of said resin, of aluminum scale intimately admixed with said resin.

12 Claims, 2 Drawing Figures

HEAT RESISTANT PRECOATED STEEL SHEET AND PROCESS FOR THE PRODUCTION THEREOF

The present invention relates to a precoated steel sheet having excellent heat resistance, corrosion resistance and formability suitable for use in the manufacture of a muffler for an automobile exhaust gas system, and to a process for the production thereof.

As a muffler for an automobile exhaust gas system, use has been made of one shaped from a hot dip aluminized steel sheet having excellent heat and corrosion resistance. However, the muffler is repeatedly subjected to corrosive heat cycles in which it is exposed to a hot exhaust gas containing moisture and corrosive materials at the time the engine is operating, and when the engine is stopped and the muffler is allowed to cool, or at the time the engine is started when the muffler is still cool, the moisture and corrosive materials are condensed and stay in it. For this reason a muffler simply shaped from a hot dip aluminized steel sheet has suffered from a disadvantage in that it is corroded within a short period of time and must be replaced.

To overcome such a disadvantage, depending upon the nature of the muffler, it has been proposed to use as a material to fabricate the muffler a hot dip aluminixed steel sheet having on at least one surface thereof, a painted organic film, and to shape it into the muffler so that the painted film constitutes the inside surface of the muffler. However prior art precoated steel sheet products are still unsatisfactory. Because the heat resistance of the painted film is insufficient, the film is partly peeled off by the action of the exhaust gas, and the corrosion proceeds through the peeled part.

On the other hand there is a recent tendency to color the outside surface of the muffler, especially in black, to improve the appearance. This coloring is normally carried out by coating a preshaped muffler with a paint of a general composition to form a coating of a desired color. In addition to the unsatisfactory corrosion resistance of the product, there is a disadvantage in that the procedure requires, because of post-coating, a series of steps of degreasing, pretreatment, painting, curing and cooling for every muffler.

Accordingly, an object of the invention is to provide a precoated steel sheet, which can be directly shaped into a muffler, and which exhibits, when used as a muffler, superior heat resistance and corrosion resistance compared to those of precoated steel sheets heretofore available.

A special object of the invention is to provide a precoated steel sheet suitable for use in the manufacture of an automobile muffler, which has beneficial properties as mentioned above and is colored in black on that surface which will constitute the outside surface of the muffler.

Another object of the invention is to provide a process for the production of the precoated steel sheets as mentioned above suitable for use in the manufacture of an automobile muffler.

According to the invention, there is provided a precoated steel sheet suitable for use in the manufacture of a muffler of an automobile exhaust gas system comprising:

a hot dip aluminized steel sheet, a chromate pretreatment layer formed on at least one surface of said hot dip aluminized steel sheet and having a chromium pickup of 10 to 50 mg/m$^2$, a primer coat formed on said pretreatment layer and comprising a cured polyamide imide resin and 8 to 52 parts by weight, based on 100 parts by weight of said resin, of strontium chromate intimately admixed with said resin, and a top coat formed on said primer coat and comprising a cured silicone-modified polyester resin with a modification degree of from 30 to 50% and 8 to 32 parts by weight, based on 100 parts by weight of said resin, of aluminum scale intimately admixed with said resin.

The invention further provides a precoated steel sheet suitable for use in the manufacture of a muffler of an automobile exhaust gas system comprising:

a hot dip aluminized steel sheet, a chromate pretreatment layer formed on each surface of said hot dip aluminized steel sheet and having a chromium pickup of 10 to 50 mg/m$^2$, a primer coat formed on said pretreatment layer and comprising a cured polyamide imide resin and 8 to 52 parts by weight, based on 100 parts by weight of said resin, of strontium chromate intimately admixed with said resin, a top coat formed on one of the primer coats and comprising a cured silicone-modified polyester resin with a modification degree of from 30 to 50% and 8 to 32 parts by weight, based on 100 parts by weight of said resin, of aluminum scale intimately admixed with said resin, a black top coat formed on the other primer coat and comprising a cured silicone-modified polyester resin with a modification degree of from 30 to 50% having intimately admixed therewith 1.5 to 5 parts by weight of aluminum scale, 3 to 5 parts by weight of a non-calcined black pigment and 4 to 6 parts by weight of silica powder, based on 100 parts by weight of said resin.

The invention still further provides a process for the production of a precoated steel sheet suitable for use in the manufacture of a muufler of an automobile exhaust gas system comprising the steps of:

treating a hot dip aluminized steel sheet, the surfaces of which have been cleaned, with a chromic acid solution to form a chromate pretreatment layer having a chromium pick-up of 10 to 50 mg/m$^2$ on at least one surface of said hot dip aluminized steel sheet;

applying onto said pretreatment layer a primer coat paint comprising a polyamide imide resin having a molecular weight of from about 2000 to 7000 dissolved in a solvent and 8 to 52 parts by weighy, based on 100 parts by weight of said resin, of strontium chromate intimately admixed with said resin, and curing the paint at a temperature of from 260° to 320° C. to form a primer coat, and applying onto said primer coat a top coat paint comprising a silicone-modified polyester resin with a modification degree of from 30 to 50% dissolved in a solvent and 8 to 32 parts by weight, based on 100 parts by weight of said resin, of aluminum scale intimately admixed with said resin, and curing the paint at a temperature of from 220° to 260° C. to form a top coat.

The invention also provides a process for the production of a precoated steel sheet suitable for use in the manufacture of a muffler of an automobile exhaust gas system comprising the steps of:

treating a hot dip aluminized steel sheet, the surfaces of which have been cleaned, with a chromic acid solution to form a chromate pretreatment layer having a chromium pick-up of 10 to 50 mg/m² on each surface of said hot dip aluminized steel sheet, applying onto said pretreatment layer a primer coat paint comprising a polyamide imide resin having a molecular weight of from about 2000 to 7000 dissolved in a solvent and 8 to 52 parts by weight, based on 100 parts by weight of said resin, of strontium chromate intimately admixed with said resin, and curing the paint at a temperature of from 260° to 320° C. to form a primer coat, and applying onto one of said primer coats a top coat paint comprising a silicone-modified polyester resin with a modification degree of from 30 to 50% dissolved in a solvent, a curing agent for said resin and 8 to 32 parts by weight, based on 100 parts by weight of said resin, of aluminum scale intimately admixed with said resin, while applying onto the other of said primer coats a black top coat paint comprising a silicone-modified polyester resin with a modification degree of from 30 to 50% dissolved in a solvent and having intimately admixed therewith 1.5 to 5 parts by weight of aluminum scale, 3 to 5 parts by weight of a non-calcined black pigment and 4 to 6 parts by weight of silica powder, based on 100 parts by weight of said resin, and a curing agent for said resin and, finally curing the paints at a temperature of from 220° to 260° C. to form top coats.

Figure 2:
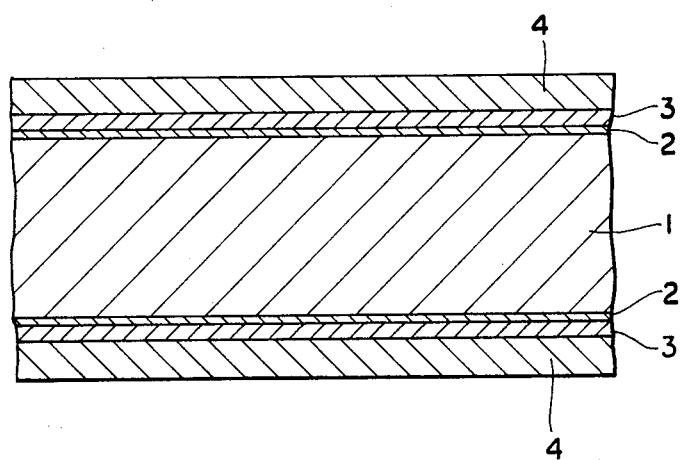

The invention will now be described with reference to the attached drawings, in which:

FIG. 1 is an enlarged cross-section of a precoated steel sheet in accordance with the invention having coated layers on one surface thereof; and FIG. 2 is an enlarged cross section of a precoated steel sheet in accordance with the invention having coated layers on both surfaces thereof.

As shown in FIG. 1, the precoated steel sheet in accordance with the invention comprises a hot dip aluminized steel sheet 1, a chromate pretreatment layer 2 formed on at least one surface of said steel sheet 1, a primer coat 3 formed on said pretreatment layer 2 and a top coat 4 formed on said primer coat 3.

A suitable hot dip aluminized steel sheet has 30 to 80 g/m² of coated metal, total in both surfaces, with Si content of 6 to 9% by weight, and a thickness of 0.4 to 1.6 mm.

The precoated steel sheet in accordance with the invention has a chromate pretreatment layer 2 formed on at least one surface of the hot dip aluminized steel sheet 1. This pretreatment layer 2 serves to improve adhesion between the metal and primer coat, thereby to enhance the corrosion resistance of the precoated steel sheet. The formation of the layer 2 can be carried out by treating a hot dip aluminized steel sheet, the surfaces of which have been cleaned, with a chromic acid solution. While solutions comprising chromic acid, phosphoric acid and acidic sodium fluoride, such as those described in British Pat. No. 830,405 are suitable, other known chromate pretreatment solutions may also be used. Whatever chromate pretreatment solutions are used, it is essential to control conditions of the treatment so that a chromate pretreatment layer having a chromium pick-up of 10 to 50 mg/m² may be formed. If the chromium pick-up is substantially lower than 10 mg/m², an appreciable improvement of the adhesion between the metal and primer coat and the corrosion resistance of the product will not be achieved. On the other hand it is frequently observed that the primer coat tends to bulge or peel off in the presence of moisture, as the chromium pick-up exceeds 50 mg/m². The hot dip aluminized steel sheet taken from the chromic acid solution is washed with hot water, e.g. at a temperature of from 60° to 80° C., e.g. for about 10 seconds, squeezed with rolls and dried with hot air e.g. at a temperature of 100° C.

The precoated steel sheet in accordance with the invention comprises on the so formed chromate pretreatment layer 2 a primer coat 3 comprising a cured polyamide imide resin and 8 to 52 parts by weight, based on 100 parts by weight of said resin, of strontium chromate intimately admixed with said resin. The formation of the primer coat 3 may be carried out by applying onto the pretreatment layer 2 a primer coat paint followed by curing the same at a temperature of from 260° to 320° C. The primer coat paint comprises a polyamide imide resin having a molecular weight of from about 2000 to 7000, prefreably from about 3000 to 6000, dissolved in a solvent and 8 to 52 parts by weight, based on 100 parts by weight of said resin, of strontium chromate, SrCrO₄, intimately admixed with said resin. For the corrosion resistance intended herein at least 8 parts by weight, based on 100 parts of the resin, of strontium chromate must be present in the primer coat, and in turn in the primer coat paint. However, the presence of the strontium chromate in the primer coat 3 in an amount substantially in excess of 52 parts by weight based on 100 parts by weight of the resin must be avoided, because such an excessive addition not only renders the primer coat 3 porous to deteriorate its properties, but also adversely affects the adhesion between the metal and primer coat thereby to lower the corrosion resistance of the product.

The polyamide imide resins suitable for use in the primer coat paint are polymers having amide linkages and imide linkages, which are soluble in a particular solvent used, preferably N-methyl -2-pyrrolidone, and have a molecular weight of 2000 to 7000, preferably 3000 to 6000. Preferred polyamide imide resins are aromatic polymers having repeating units of the general formula I, II or III, which constitute at least 70% by mole of the polymer chain, with the remaining 30% by mole or less of the polymer chain being represented by repeating units of the general formula IV or V,

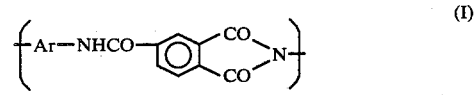

(I)

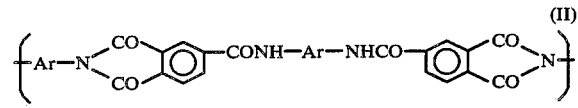

(II)

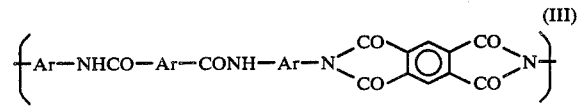

(III)

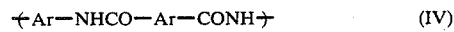

(IV)

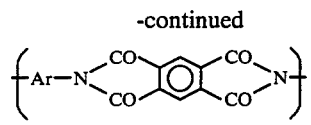 (V)

In the above formulae, Ar independently represents a divalent aromatic group selected from

 and

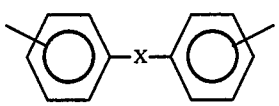

wherein X represents —O—, —S—, —CO—, —CH$_2$— or

Incidentally, a part of the imide linkages shown in the formulae I, II, III and V above may be in the state of its precursor before ring closure, that is the amide linkage. Some of the preferred polyamide imide resins are described in Japanese Patent Pulication No. 57-61775 and Japanese Patent Laid open Application No. 59-8755. Some of them are commercially available. Especially preferred polyamide imide resins are those in which at least 85% by mole of the polymer chain is represented by the repeating unit of the formula III above, wherein all of the Ar are o-phenylene, and which have a molecular weight of about 3000 to 6000.

As the solvent, N-methyl-2-pyrrolidone is most preferred, but other organic polar solvents, including, for example, dimethylformamide, dimethylacetamide, dimethylsulfoxide and hexamethylphosphoamide may also be used, so far as they dissolve the polyamide imide resin used, The primer coat 3 should preferably has a thickness of 3 to 8 μm on dry basis. The primer coat paint is conveniently applied by a roll coating method, and the consistency of the primer coat paint is adjusted so that the above mentioned thickness on dry basis may be obtained by the roll coating method. For the above mentioned dry thickness the curing time can be as short as about 60 seconds of less, for example, 40 seconds or less, at a curing temperature (temperature of atmosphere in the curing furnace) of from 260° to 320° C.

The precoated steel sheet according to the invention further comprises a top coat 4 on the so formed primer coat 3, the top coat 4 comprising a cured silicone-modified polyester resin with a modification degree of from 30 to 50% and 8 to 32 parts by weight, based on 100 parts by weight of said resin, of aluminum scale intimately admixed with said resin. The formation of the top coat 4 may be carried out by applying onto the primer coat 3 a top coating paint followed by curing the same at a temperature of 220° to 260° C.

The top coat paint comprises a silicone-modified polyester resin with a modification degree of from 30 to 50% dissolved in a solvent, a curing agent for the resin and 8 to 32 parts by weight, based on 100 parts by weight of said resin, of aluminum scale intimately admixed with said resin. For the purpose of the invention 8 to 32 parts by weight, based on 100 parts by weight of the resin, of aluminum scale must be present in the top coat 4, and in turn in the top coat paint. The size and shape of preferred aluminum scale are such that it has an average size (average length of the longest side) of 15 to 35 μm and at least 99% may pass through a seive of JIS 325 mesh, and that it has an average aspect ratio (ratio of the longer diameter to the shorter diameter) of 10 to 50. Such aluminum scale serves to enhance the heat resistance and adhesion of the painted films, and in addition, it further protects the aluminum coated layer by physical shielding effect due to its scale shape. To achieve appreciable such results addition of at least 8 parts by weight, based on 100 parts by weight of the resin, of aluminum scale is required. But addition of aluminum scale substantially in excess of 32 parts by weight, based on 100 parts by weight of the resin must be avoided, or otherwise the resin coated layers will become brittle, leading to a poor formability of the product.

By the term "a silicone-modified polyester resin" we mean a polyester resin, normally used in polyester paints, which has been modified with an organopolysiloxane olygomer having 3 to 12 silicon atoms and having 2 to 4 terminal groups selected from —SiOH and —SiOR', wherein R' represents a lower alkyl having 1 to 4 carbon atoms, preferably methyl. Examples of preferred silicone modifiers are those of the formulae VI and VII.

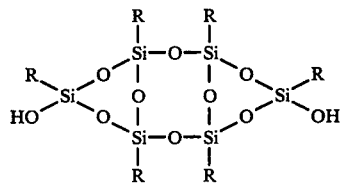 (VI)

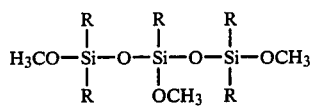 (VII)

In the above formulae, the Rs are the same or different, and represent monovalent organic groups normally found in conventional organopolysiloxanes. We prefer that all the Rs are methyl, or almost all the Rs are methyl with the remaining being phenyl. Modification of the polyester for painting with the silicone modifier may be carried out by heating the polyester together with the modifier under a stream of an inert gas such as nitrogen in the presence of a suitable solvent or in the absence of any solvent to condense them. Upon condensation methanol of water is split off. By the term "modification degree" of the silicone-modified polyester we mean the percentage by weight of the portions derived from the silicone modifier in the modified polyester. For a satisfactory heat resistance aimed herein, the silicone modification degree should be at least 30%, preferably at least 35%. But with the modification degree substantially in excess of 50%, the workability and corrosion resistance of the coating tends to become unsatisfactory, and thus, the use of an excessively modified polyester resin must be avoided. A varnish of a suitable silicone-modified polyester resin is commercially available, and may be conveniently used in preparing the top coat paint.

In the top coat paint a suitable amount of a curing agent for the particular silicone modified polyester resin is added. Examples of suitable curing agent include, for example, urea, melamineand organic isocyanates as well as derivatives thereof.

The top coat paint may be conveniently prepared by adding to a varnish of a silicone-modified polyester resin, suitable amounts of the aluminum scale, the curing agent and an additional amount of solvent, and mixing the resultant mixture.

The thickness of the top coat 4 on dry basis should preferably be thicker than that of the primer coat 3, and can be for example about 8 to 20 $\mu$m. The top coat paint may be conveniently applied by a roll coating method, and the consistency of the paint may be adjusted in advance of the application so that the above-mentioned final thickness on dry basis may be obtained by the roll coating method. For the above-mentioned thickness on dry basis the curing time at the above-mentioned curing temperature (220° to 260° C.) can be, for example, from about 50 to 70 seconds. The strip leaving the curing furnace may be cooled with sprayed water, squeezed with rolls and dried with hot air, for example, at a temperature of about 50° C.

That side of the precoated steel sheet in accordance with the invention shown in FIG. 1, which is not shown in that Figure, can be the surface of the aluminum hot dip coated steel sheet 1 as such, or in the state that the chromate pretreatment layer 2 only has been formed on the surface of the hot dip aluminized steel sheet 1, or in the state that via the pretreatment layer 2 one or two layers of suit able heat resistant resins have been formed on the hot dip aluminized steel sheet 1.

Alternatively, the precoated steel sheet in accordance with the invention may comprise, as shown in FIG. 2, the hot dip aluminized steel sheet 1 as described above, having on each surface thereof, via a chromate pretreatment layer 2, as described above, both the primer and top coats, as described above. In the precoated steel sheet shown in FIG. 2, the two pretreatment layer 2, two primer coats 3, and two top coats 4 may be respectively the same and may be respectively formed at the same time in the manner as described above.

When a muffler with the outside surface colored in black is desired, use may be made of a precoated steel sheet in accordance with the invention comprising a hot dip aluminized steel sheet 1, as described above, having formed on one surface thereof a chromate pretreatment layer 2, a primer coat 3 and a top coat 4, which are the same as described above, and also having formed on the other surface thereof a chromate pretreatment layer 2 and a primer coat 3, which are the same as described above, and top coat containing a black pigment. Such a precoated steel sheet in accordance with the invention may be shaped into a muffler so that the black top coat may constitute the outside surface of the muffler. The black top coat may be generally a coated layer of a cured heat resistant resin, having incorporated therein a black pigment. Optimum results have been obtained, however, by using a silicone-modified polyester resin with a modification degree of 30 to 50%, as described above, as the heat resistant resin, and a non-calcined black pigment, such as carbon black having a relatively large specific surface area ranging between 500 and 2000 m$^2$/g, as the coloring agent, and by incorporating a small amount of aluminum scale as described above and a small amount of silica powder as a matting agent. More precisely, the best results have been obtained by a black top coat comprising a cured siliconemodified polyester resin with a modification degree of 30 to, 50% having intimately admixed therewith 1.5 to 5 parts by weight of aluminum scale, 30 to 40 parts by weight of a non calcined black pigment and 4 to 6 parts by weight of silica powder, based on 100 parts by weight of said resin. The precoated steel sheet in accordance with the invention having such a preferred black top coat may be prepared by forming on both surfaces of the hot dip aluminized steel sheet 1 the chromate pretreatment layers 2 and the primer coats 3 in the manner as described above, and applying onto one of said primer coats 3 a top coat paint comprising a silicone-modified polyester resin with a modification degree of from 30 to 50% dissolved in a solvent, a curing agent for said resin and 8 to 32 parts by weight, based on 100 parts by weight of said resin, of aluminum scale intimately admixed with said resin,/while applying onto the other of said primer coats 3 a black top coat paint comprising a silicone-modified polyester resin with a modification degree of from 30 to 50% dissolved in a solvent and having intimately admixed therewith 1.5 to 5 parts by weight of aluminum scale, 3 to 5 parts by weight of a non-calcined black pigment and 4 to 6 parts by weight of silica powder, based on 100 parts by weight of said resin, and a curing agent for said resin and, finally curing the top coat paints a temperature of from 220° to 260° C. to form top coats. Both top coat paints may be applied in the manner described above, and may be cooled and dried at the same time in the manner as described above.

The invention will be further described by the following Examples.

EXAMPLE 1

A hot dip aluminized steel sheet (200 mm wide, 300 mm long and 0.6 mm in thickness) having 40 g/m$^2$ (total on both surfaces) of the coating metal with 6% by weight of Si was immersed for about 10 seconds in "Ridoline 35 N1" (an alkaline degreasing solution supplied by Nippon Paint Co., Ltd.) having the ingredient concentration adjusted at 4% by weight and maintained at a temperature of 60° C., taken out of the liquid, and washed with hot water at about 70° C. for about 10 seconds.

A mixed solution of "Arozin #407" having the ingredient concentration adjusted at 4% by weight and "Arozin #47" having the ingredient concentration adjusted at 0.6% by weight was maintained a temperature of 60° C., The "Arozin #407" and "Arozin #47" are acidic chromate formation liquids of chromic acid-phosphoric acid series, supplied by Nippon Paint Co.,Ltd. The aluminum hot dip coated steel sheet, the surfaces of which had been cleaned, was immersed in the mixed solution for about 10 seconds, whereby chromate pretreatment layers, each having a chromium pick-up of about 25 mg/m$^2$, were formed on both surfaces of the aluminum coated steel sheet. The sheet taken out of the pretreatment solution was washed with hot water at about 70° C. for about 10 seconds and dried with hot air at about 100° C. In this way many pretreated sheets were prepared.

To a polyamide imide resin varnish (a solution of a polyamide imide resin having an average molecular weight of about 4500 in N-methyl-2-pyrrolidone) strontium chromate in an amount indicated in Table 1 was added, and the resultant mixture was diluted under stirring with an appropriate amount of N-methyl-2-pyrrolidone to prepare each primer coat paint. It was applied by a roll coating method onto one surface of the pretreated hot dip aluminized steel sheet, and cured for about 40 seconds in a conveyer-oven maintained at a temperature of 280° C., to form a primer coat having a dry thickness of about 4 μm.

To a varnish having dispersed therein a silicone-modified poly ester resin with a modification degree indicated in Table 1 and 20 parts by weight of methylated melamine based on 100 parts by weight of the resin as a curing agent, non-leafing type aluminum scale (more than 99% by weight of which was capable of passing through a sieve of JIS 325 mesh) having an average size of about 25 μm and an average aspect ratio of about 20, in an amount indicated in Table 1 was added and the resultant mixture was diluted under stirring with an appropriate amount of a solvent to prepare each top coat paint. It was applied by a roll coating method onto the primer coat and cured for about 60 seconds in a conveyer-oven maintained at a temperature of 230° C., to form a top coat having a dry thickness of about 12 μm. The sheet removed from the oven was cooled by spraying water, squeezed with rolls and dried with warm air of a temperature of about 50° C.

The coated steel sheet samples were tested for the heat resistance, corrosion resistance and formability, and results were estimated in accordance with the following manner and are shown in Table 1.

(1). Heat resistance

The sample was heated in a hot air circulating dryer at a predetermined temperature indiceted in Table 1 for 200 hours, conditioned at 20° C. and 60% RH for 24 hours, and then subjected to an adhesion test in accordance with JIS-G3312. The heat resistance of the sample was estimated according to the following rating.
A: Completely no peeling of the painted film
B: Slight peeling of the painted film
C: Considerable peeling of the painted film
D: Remarkable peeling of the painted film (2). Corrosion resistance A 500 hours salt spray test in accordance with JIS-Z2371 (SST) and a 500 hours Humidity test in accordance with JIS-K2246 (BB) were carried out. The corrosion resistance of the sample was estimated according to the following rating.
A: Absolutely no hulging of the painted film and occurrence of no rust
B: Slight bulging of the painted film and occurrence of slight rust
C: Considerable bulging of the painted film and occurrence of considerable rust
D: Remakable bulging of the painted film and occurrence of remarkable rust (3) Formability The sample was bent by an angle of 180 degrees in such a manner that a stack of 4 sheets, each having the same thickness as the sample, was sandwitched between between the bent halves of the sample. The stressed portion of the sample was subjected to an adhesion test in accordance with JIS-3312. The formability of the sample was estimated according to the following rating.
A: Absolutely no peeling of the painted film
B: Very slight peeling of the painted film
C: Considerable peeling of the painted film
D: Full peeling of the painted film The test results are shown in Table 1 together with the composition of the painted films of the tested samples.

TABLE 1

| Run No. | Primer coat Resin (100 wt. part) | Strontium chromate (wt. parts) | Top coat Resin (100 wt. parts) | Aluminum scale (wt. parts) | Heat resistance 200 hrs. 250° C. | 270° C. | 300° C. | Corrosion resistance 500 hrs. S.S.T | B.B.T | Formability 180° 4t bend |
|---|---|---|---|---|---|---|---|---|---|---|
| 1 | Polyamide imide | 20 | Silicone polyester (35) | 10 | A | B | B | B | A | B |
| 2 | Polyamide imide | 20 | Silicone polyester (35) | 20 | A | B | B | A | A | B |
| 3 | Polyamide imide | 20 | Silicone polyester (35) | 30 | A | A | B | A | A | B |
| 4 | Polyamide imide | 20 | Silicone polyester (45) | 10 | A | A | B | B | A | B |
| 5 | Polyamide imide | 20 | Silicone polyester (45) | 20 | A | A | A | A | A | B |
| 6 | Polyamide imide | 20 | Silicone polyester (45) | 30 | A | A | A | A | A | B |
| 7 | Polyamide imide | 40 | Silicone polyester (35) | 20 | A | B | B | A | A | B |
| 8 | Polyamide imide | 40 | Silicone polyester (45) | 20 | A | A | A | A | A | B |
| 9 | Polyamide imide | 20 | Silicone polyester (35) | 5 | B | C | D | C | B | B |
| 10 | Polyamide imide | 20 | Silicone polyester (35) | 50 | B | C | D | A | A | D |
| 11 | Polyamide imide | 20 | Silicone polyester (20) | 20 | B | D | D | B | A | B |
| 12 | Polyamide imide | 20 | Silicone polyester (20) | 20 | A | A | A | B | A | D |
| 13 | Polyamide imide | 5 | Silicone polyester (45) | 20 | A | A | A | D | C | B |
| 14 | Polyamide imide | 70 | Silicone polyester (45) | 20 | B | B | C | C | C | D |

Runs No. 1~8: According to the invention
Runs No. 9~14: Controls

EXAMPLE 2

In this example, the heat resistance, corrosion resistance and formability of various black colored coatings were examined.

Carbon black having a specific surface area of 1050 m/g and aluminum scale as used in Example 1, respectively in amounts as indicated in Table 2, were added to a varnish of silicone-modified polyester resin as used in Example 1 and the resultant mixture was diluted under stirring with an appropriate amount of a solvent to prepare each top coat paint.

Using the top coat paints so prepared and primer coat paints suitable for the provision of primer coats indicated in Table 2, the procedure as described in Example 1 was followed to prepare samples to be tested.

The samples so prepared were tested for the heat resistance, corrosion resistance and formability as in Example 1.

The results are shown in Table 2.

TABLE 2

| | Primer coat | | Top Coat | | | | Heat resistance 200 hrs. | | | Corrosion resistance 500 hrs. | | Form- ability |
| | | | | Aluminum scale | Carbon black | Silica | | | | | | 180° 4t |
| Run No. | Resin 100 wt. part | Strontium chromate (wt. parts) | Resin (100 wt. parts) | (wt. parts) | (wt. parts) | (wt. parts) | 250° C. | 270° C. | 300° C. | S.S.T | B.B.T | bend |
|---|---|---|---|---|---|---|---|---|---|---|---|---|
| 1 | Polyamide imide | 20 | Silicone polyester (35) | 2 | 4 | 4 | A | B | B | B | B | B |
| 2 | Polyamide imide | 20 | Silicone polyester (35) | 4 | 4 | 4 | A | A | B | B | B | B |
| 3 | Polyamide imide | 20 | Silicone polyester (45) | 2 | 4 | 4 | A | A | B | B | B | B |
| 4 | Polyamide imide | 20 | Silicone polyester (45) | 4 | 4 | 4 | A | A | A | B | B | B |
| 5 | Polyamide imide | 20 | Silicone polyester (35) | 0 | 4 | 4 | B | C | D | C | B | B |
| 6 | Polyamide imide | 20 | Silicone polyester (35) | 10 | 4 | 4 | B | C | D | B | B | B |
| 7 | Polyamide imide | 20 | Silicone polyester (20) | 4 | 4 | 4 | B | D | D | B | B | B |
| 8 | Polyamide imide | 20 | Silicone polyester (70) | 4 | 4 | 4 | A | A | A | B | B | D |
| 9 | Polyamide imide | 5 | Silicone polyester (35) | 2 | 4 | 4 | A | B | B | D | C | B |
| 10 | Polyamide imide | 70 | Silicone polyester (35) | 2 | 4 | 4 | B | C | C | C | C | C |
| 11 | Polyamide imide | 20 | Silicone polyester (35) | 2 | 10 | 4 | B | C | D | B | C | D |
| 12 | Polyamide imide | 20 | Silicone polyester (35) | 2 | 4 | 10 | B | C | D | C | C | D |

Runs Nos. 1~4; Black top cort layer recommended herein
Runs Nos. 5~12; Controls

What is claimed is:

1. A precoated steel sheet suitable for use in the manufacture of a muffler of an automobile exhaust gas system comprising:
   a hot dip aluminized steel sheet,
   a chromate pretreatment layer formed on at least one surface of said hot dip aluminized steel sheet and having a chromium pick-up of 10 to 50 mg/m², 
   a primer coat formed on said pretreatment layer and comprising a cured polyamide imide resin and 8 to 52 parts by weight, based on 100 parts by weight of said resin, of strontium chromate intimately admixed with said resin, and
   a top coat formed on said primer coat and comprising a cured silicone-modified polyester resin with a modification degree of from 30 to 50% and 8 to 32 parts by weight, based on 100 parts by weight of said resin, of aluminum scale intimately admixed with said resin.

2. The precoated steel sheet in accordance with claim 1 wherein said hot dip aluminized steel sheet has a thickness of 0.4 to 1.6 mm, said primer coat has a thickness of 3 to 8 μm, and said top coat has a thickness of 8 to 20 μm.

3. The precoated steel sheet in accordance with claim 2 wherein said aluminum scale has an average size of 15 to 35 μm and an aspect ratio of from 10 to 50.

4. A precoated steel sheet suitable for use in the manufacture of a muffler of an automobile exhaust gas system comprising:
   a hot dip aluminized steel sheet,
   a chromate pretreatment layer formed on each surface of said hot dip aluminized steel sheet and having a chromium pick-up of 10 to 50 mg/m², 
   a primer coat formed on said pretreatment layer and comprising a cured polyamide imide resin and 8 to 52 parts by weight, based on 100 parts by weight of said resin, of strontium chromate intimately admixed with said resin,
   a top coat formed on one of the primer coats and comprising a cured silicone-modified polyester resin with a modification degree of from 30 to 50% and 8 to 32 parts by weight, based on 100 parts by weight of said resin, of aluminum scale intimately admixed with said resin, and
   a black top coat formed on the other primer coat and comprising a cured silicone-modified polyester resin with a modification degree of from 30 to 50% having intimately admixed therewith 1.5 to 5 parts by weight of aluminum scale, 3 to 5 parts by weight of a non calcined black pigment and 4 to 6 parts by weight of silica powder, based on 100 parts by weight of said resin.

5. The precoated steel sheet in accordance with claim 4 where in said hot dip aluminized steel sheet has a thickness of 0.4 to 1.6 mm, said primer coat has a thickness of 3 to 8 μm, and said top coat has a thickness of 8 to 20 μm.

6. The precoated steel sheet in accordance with claim 5 wherein said aluminum scale has an average size of 15 to 35 μm, and an aspect ratio of from 10 to 50.

7. The precoated steel sheet in accordance with claim 4 wherein said non-calcined black pigment has a specific surface area of from 500 to 2000 m²/g.

8. A process for the production of a precoated steel sheet suitable for use in the manufacture of a muffler of an automobile exhaust gas system comprising the steps of:
   treating a hot dip aluminized steel sheet, the surfaces of which have been cleaned, with a chromic acid solution to form a chromate pretreatment layer having a chromium pick-up of 10 to 50 mg/m² on at least one surface of said hot dip aluminized steel sheet,
   applying onto said pretreatment layer a primer coat paint comprising a polyamide imide resin having a molecular weight of from about 2000 to 7000 dissolved in a solvent and 8 to 52 parts by weighy, based on 100 parts by weight of said resin, of strontium chromate intimately admixed with said resin, and curing the paint at a temperature of from 260° to 320° C. to form a primer coat, and
   applying onto said primer coat a top coat paint comprising a silicone-modified polyester resin with a modification degree of from 30 to 50% dissolved in a solvent and 8 to 32 parts by weight, based on 100 parts by weight of said resin, of aluminum scale intimately admixed with said resin, and curing the paint at a temperature of from 220° to 260° C. to form a top coat.

9. The process for the production of a precoated steel sheet in accordance with claim 8, wherein said aluminum scale has an average size of 15 to 35 μm and an aspect ratio of from 10 to 50.

10. A process for the production of a precoated steel sheet suitable for use in the manufacture of a muffler of an automobile exhaust gas system comprising the steps of:

treating a hot dip aluminized steel sheet, the surfaces of which have been cleaned, with a chromic acid solution to form a chromate pretreatment layer having a chromium pick-up of 10 to 50 mg/m$^2$ on each surface of said hot dip aluminized steel sheet, applying onto said pretreatment layer a primer coat paint comprising a polyamide imide resin having a molecular weight of from about 2000 to 7000 dissolved in a solvent and 8 to 52 parts by weight, based on 100 parts by weight of said resin, of strontium chromate intimately admixed with said resin, and curing the paint at a temperature of from 260° to 320° C. to form a primer coat, and applying onto one of said primer coats a top coat paint comprising a silicone-modified polyester resin with a modification degree of from 30 to 50% dissolved in a solvent, a curing agent for said resin and 8 to 32 parts by weight, based on 100 parts by weight of said resin, of aluminum scale intimately admixed with said resin, while applying onto the other of said primer coats a black top coat paint comprising a silicone-modified polyester resin with a modification degree of from 30 to 50% dissolved in a solvent and having intimately admixed therewith 1.5 to 5 parts by weight of aluminum scale, 3 to 5 parts by weight of a non- calcined black pigment and 4 to 6 parts by weight of silica powder, based on 100 parts by weight of said resin, and a curing agent for said resin, and curing the paints at a temperature of from 220° to 260° C. to form top coats.

11. The process for the production of a precoated steel sheet in accordance with claim 10 wherein said aluminum scale has an average size of 15 to 35 μm, and an aspect ratio of from 10 to 50.

12. The process for the production of a precoated steel sheet in accordance with claim 10 wherein said non-calcined black pigment has a specific surface area of from 500 to 2000 m$^2$/g.

* * * * *